Feb. 3, 1959 I. ZAKARIAS 2,872,534

INTERSTAGE COUPLING CIRCUITS FOR HIGH FREQUENCY MULTIGRID VOLTAGE AMPLIFIERS

Filed May 16. 1956

INVENTOR

IMRE ZAKARIAS

BY Young, Emery + Thompson

ATTORNEYS

United States Patent Office 2,872,534

Patented Feb. 3, 1959

2,872,534

INTERSTAGE COUPLING CIRCUITS FOR HIGH FREQUENCY MULTIGRID VOLTAGE AMPLIFIERS

Imre Zakariás, Budapest, Hungary, assignor to Egyesült Izzólampa ës Villamossági Részvenytársaság, Budapest, Hungary Application May 16, 1956, Serial No. 585,300

Claims priority, application Hungary May 20, 1955

6 Claims. (Cl. 179—171)

This invention relates to circuit arrangements for amplifying voltages of very high frequency by means of electron tubes each having at least two lead-in conductors of the cathode. Examples of suitable multi-grid electron tubes are described in my co-pending patent application Ser. No. 585,299, filed May 16, 1956.

It is customary to use circuit arrangements for this purpose with electron tubes operating in high vacuum in which the capacitance between the control grid and the plate of up-to-date multigrid amplifier tubes constructed as high-frequency pentodes is of a very small value, generally lower than 0.01 pF (picofarad) and in consequence thereof the coupling of the tuned circuits connected to the control grid and to the plate, respectively, is very loose. Owing to this, the voltage amplification factor, i. e. the gain which can be obtained by means of a single tube, may be very large, gains of 100–200 being obtainable without the danger of self-excitation, and therefore such voltage amplification is broadly practised in the intermediate-frequency stages, working with frequencies of the range of about 0.5 mc./s. (megacycles/sec.), of radio receiving sets of conventional design.

It is also known that in the case of amplification of voltages of very high frequency, especially of those of frequencies exceeding 20 mc./s., the small value of the capacitance between the control grid and the plate of the amplifying tubes mentioned above is not small enough to ensure the looseness of coupling between the tuned circuits connected to these electrodes necessary to avoid the danger of self-excitation. It has been found that this drawback is particularly due to the fact that in the case of very high frequencies the major part of the tuning capacitance of the circuits is constituted by the input and output capacitances of the amplifier tube. This is true especially in the case of the intermediate-frequency broad-band amplification of television receiving sets. It has also been found that a further reason of the disadvantages mentioned above consists in the fact that the inductance of the lead-in conductors of the grounded electrodes adjacent to the control grid and to the plate, as well as the inductances of the lead in conductors of the cathode, the screening grid, the suppressor grid and the screening means, such as screening shields, constitute, in the case of very high frequencies, impedances which are by no means negligible. In consequence, in the case of such very high frequencies, the capacitances present between the control grid and the plate, the cathode, the suppressor grid, the screening means and the screening grid respectively cause a substantially tighter coupling between the tuned circuits, than is caused by the usual small capacitance between the control grid and the plate in the case of moderately high frequencies.

In consequence of these facts the first tuning of the so-called detuned stages of the intermediate-frequency broad-band amplifiers, as used in television receiving sets, is a complicated and tedious operation. A further important drawback is that this tuning has to be performed again on occasion of each changing of the amplifier tubes in question. This is due to the fact that according to my own experience as well as to the technical literature of this art the tunings of the different tuned circuits are not independent of each other, and in consequence thereof the characteristics curve of transmission changes on occasion of the changing of an amplifier tube, as a result of the unavoidable divergences of the inductances and capacitances of the component parts of different individual amplifier tubes, determining the input and output of each individual tube.

I have further found that in the case of very high frequencies, the value of the capacitances and mutual inductances present between the component parts of the amplifier tubes are mainly dependent upon the relative arrangement of the lead-in conductors of the tube and of the high frequency separation of the circuits of the control grids and the plates. The paths of the high-frequency currents must be rigorously prescribed. Therefore in the case of a tube provided with a cathode having two separate lead-in conductors the high frequency current of the circuit of the control grid or at least the major part of this current must be forced to flow through the lead-in conductors of the cathode connected to this circuit, and the high frequency current of the plate-circuit must be forced to flow through the lead-in conductors of the cathode connected to the plate-circuit.

A primary object of the present invention is the provision of an improved circuit arrangement for amplifying voltages of a very high frequency which will obviate the drawbacks mentioned above.

An important object of the invention is the provision of an improved circuit arrangement for amplifying voltages of a very high frequency, said circuit arrangement containing multi-grid vacuum tubes, each tube having a cathode with at least two lead-in conductors and means to force the high frequency current to follow prescribed courses.

Still another object of the invention is the provision of means adapted to diminish the capacitance present between the cathode and the control grid and the plate respectively as well as between the suppressor grid and the screening means on one hand and the control grid and the plate on the other hand.

A further important object of the invention is the provision of means adapted to reduce the impedance represented by the mutual inductance of the lead-in conductors of the grounded electrodes adjacent to the cathode and the plate respectively.

In accordance with the invention, the circuit arrangement for amplifying voltages of very high frequency comprises a plurality of multi-grid amplifier tubes, the cathodes of the tubes having each at least two lead-in conductors. The circuit arrangement further comprises tuned circuits, each of these tuned circuits being connected on the one hand with the plate of the amplifier tube of the foregoing stage and on the other hand with the control grid of the amplifier tube of the subsequent stage. The cold point of each tuned circuit has connections to the bypass capacitor of the screen grid of the subsequent stage, and to one of the lead-in conductors of the cathode of the subsequent stage. The cold point of each tuned circuit also has connections to the suppressor grid and to the screening means of the foregoing stage, and to one of the lead-in conductors of the cathode of the foregoing stage. The screening means is preferably a screening shield and is grounded adjacent the tube wall either inside or outside of the tube wall. The said cold point of every tuned circuit is grounded. Alternate ones of the tuned circuits have their cold points grounded directly, whereas the remaining tuned circuits have their cold points grounded through a separating resistor. Thus, only one of the two cathode lead-in conductors of each discharge tube is directly grounded for high frequency, the other lead-in conductor of said cathode being grounded through said separating resistor.

It will be understood that the term "cold point" used in this description and in the appended claims designates all those electrodes and component parts of the various circuits, especially tuned circuits, which are not or at least not on purpose exposed to voltages of high frequency. On the contrary, the term "hot point" is used in this description and in the appended claims to designate all those electrodes and component parts of the various circuits kept on purpose on voltages of very high frequency, such as for example the control grid and the plate.

The foregoing and other objects, features and advantages of the invention will be understood from the following detailed description referring to the accompanying drawing, in which.

Figure 1:
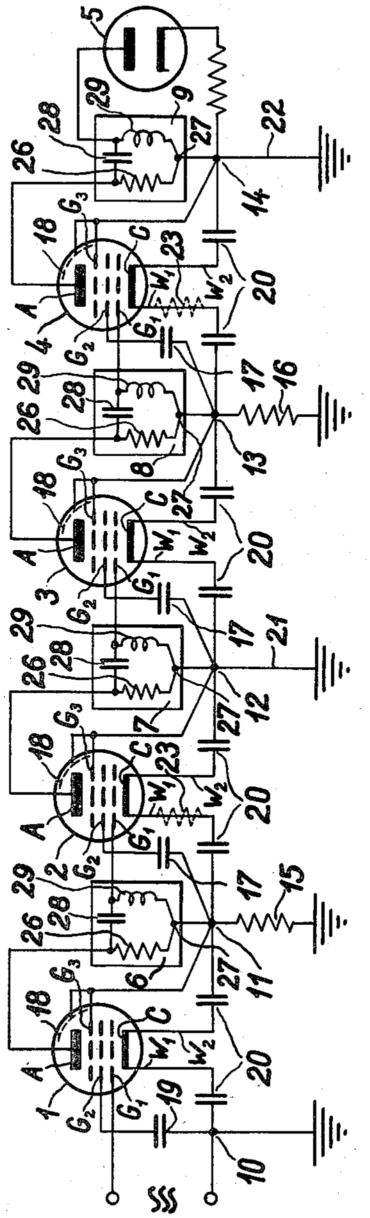
Fig. 1 is a schematic wiring diagram showing the electrical characteristics of the pertinent components of a circuit arrangement according to the invention.

Referring to Fig. 1 it shows, by way of example, a circuit arrangement according to the invention and adapted to the amplification of voltages of very high frequencies, such as used, for example, in the intermediate amplifier stage of video systems. There are provided four amplifier tubes 1, 2, 3 and 4. In the preferred embodiment shown in Fig. 1 these tubes are pentodes. Each one of the pentodes 1, 2, 3 and 4 has two lead-in conductors $w_1$ and $w_2$ for the cathode C of the tube. The pentodes 1, 2, 3 and 4 connected in series combination may be of any known kind provided with cathodes C with at least two lead-in conductors $w_1$ and $w_2$, but I prefer to use pentodes such as described in my co-pending patent application Serial No. 585,299. The reference number 5 denotes the detector tube of the circuit arrangement, reference numbers 6, 7, 8 and 9 denote fixed tuned circuits and the coordinated coupling means inserted between two subsequent pentodes.

In the example shown in Fig. 1 each of said fixed tuned circuits comprises a resistor 26 connected on one of its ends to the plate A of the immediately foregoing amplifier tube and on the other of its ends 27 to the respective junction point 11, 12, 13, 14. Further components of said fixed tuned circuits are the blocking capacitors 28 and the inductances 29, each inductance 29 being connected on one of its ends to the grid $G_1$ of the subsequent amplifier tube and on the other of its ends to one of said junction points 11, 12, 13, 14 respectively. With the wiring shown in Fig. 1 it is obvious that—except the control grid $G_1$ of the first tube 1—there is coordinated to each control grid $G_1$, a tuned circuit 6, 7, 8 respectively and to each plate A another tuned circuit 6, 7, 8, 9 respectively in such a manner that the plate circuit of one amplifier tube except the circuit of the plate A of the last tube 4 forms simultaneously the control grid circuit of the subsequent tube. Each of the tuned circuits 6, 7, 8 and 9 has a cold point 27, directly connected to a junction point 11, 12, 13 and 14, respectively, and each of these junction points—excepting point 14 connected to the cathode of the detector tube 5—has six connections. One of these connects the said junction point, by means of the bypass capacitor 20, with the lead-in conductor $W_2$ of that amplifier tube, the suppressor grid $G_3$ of which is connected, by means of the second connection, to said junction point and the plate A of which is connected to a hot point of the same tuned circuit, the cold point of which tuned circuit is connected, by means of the third connection, to said junction point. The fourth connection leads, across the bypass capacitor 17, to the screen grid $G_2$ of that amplifier tube, the control grid $G_1$ of which tube is connected to a hot point of the tuned circuit connected with said junction point by means of said third connection. The fifth connection connects the junction point, by means of another bypass capacitor 20, to the lead-in conductor $W_1$ of the cathode of that tube, the screen grid $G_2$ of which is connected, by means of said fourth connection, to said junction point. The sixth connection leads to ground, either directly, or across the separating resistors 15 and 16 respectively. Thus, each cold point 27 of each tuned circuit which is connected to the control grid $G_1$ and the bypass capacitor 17 of the screen grid $G_2$ of the subsequent tube is connected to one of the lead-in conductors $W_2$ of the cathode C of the tube of the foregoing stage. The cold point 27 of that tuned circuit, which is connected to the plate A, the suppressor grid $G_3$ and one or more screening means, such as a screening shield 18 provided inside the tube of the foregoing stage, is connected to the lead-in conductor $W_1$ of the cathode C of the subsequent amplifier tube, except cold point 27 of tuned circuit 9 connected with the cathode of detector tube 5. The screen grids $G_2$ of the amplifier tubes 2, 3 and 4 and the lead-in conductors $W_1$ of the respective cathodes C are thus connected to the cold point 27 of the tuned circuit coordinated to the plate A of the foregoing amplifier tubes 1, 2 and 3, respectively, the suppressor grids $G_3$ and the screening means 18 provided inside the tubes being connected to the lead-in conductors $W_2$ of the cathodes C of said tubes 1, 2 and 3. Reference numerals 10, 11, 12, 13 and 14 designate the junction points of the circuit arrangement, grounded either directly or across the separating resistors 15 and 16 respectively for joints 11 and 13. According to the invention, in addition to the tuned circuits 6, 7, 8 and 9, further tuning means are formed by capacitances, mainly by the input and output capacitances of the amplifier tubes applied in the circuit arrangement according to the invention and, by the capacitance of the wiring. For this purpose an additional trimmer capacitor may also be used.

The screening shield 18 may also be provided on the outer wall of the envelope and may be of any usual shape.

The screen grids $G_2$ of the amplifier tubes and the lead-in conductors of the cathodes are connected to the junction points 10, 11, 12, 13 and 14 of the circuit arrangement by means of by-pass capacitors 17, 19 and 20 respectively. The tuned circuits connected to the control grids $G_1$ and the circuits connected to the plates A are separated from one another by means of direct high frequency grounding of one of the two lead-in conductors of the cathode as shown at 21 and 22 and by means of grounding across a separating resistor 15 and 16 respectively. Supposing a band-width of 6 mc./s., pentodes according to my co-pending application Ser. No. 585,299 may be used as amplifier tubes 1, 2, 3 and 4 at 50 mc./s. operating frequency, and the value of the resistances 15 and 16 may be between 20–700 ohms. This resistance value may vary with other bandwidths, other operating frequencies and other types of amplifier tubes.

It is to be understood that component parts, such as the control grid circuit and its coupling means as well as the plate-circuit and its coupling means are to be provided with screening means, these means being connected to their coordinated lead-in conductors of the cathode.

Each of the circuits 6, 7, 8 and 9 may be located inside a screening box. In this case I prefer to ground said box by connecting it to its correlated cold point 27 and junction points 11, 12, 13, 14 respectively.

In the circuit arrangement according to the invention there may be applied automatically controlled amplifier tubes known in the art. Owing to the fact that the plate-current flows back to the lead-in conductor of the cathode connected to the control grid circuit through a separate lead-in conductor of the cathode, I prefer to employ a resistor 23 in series with one of the by-pass capacitors 20 in the lead-in conductor $w_1$ of the cathode without any high frequency by-pass. These resistors 23 are shown in dotted lines in Fig. 1. The value of the resistance of this resistor is preferably selected according to the ratio of the cathode current to the screen grid current, thus said value is a multiple of the usual value. The term "usual value" of this resistance is applied here for the value with which the input capacitance remains unaltered if the gain of the tube is controlled by varying the bias of the first grid. If, for instance, the "usual value" of said resistance is of about 35 ohms, the value of the resistance 23 may be increased up to about 165 ohms.

The wiring of the circuit arrangement according to the invention is to be performed in such a manner that in each one of the amplifier tubes the capacitance not only between the two hot points of the tube, but also between one hot point and the cold points correlated to the other hot point should be small. In order to attain this result screening shields may be provided in the sockets of the amplifier tubes 1, 2, 3 and 4.

Figure 2:
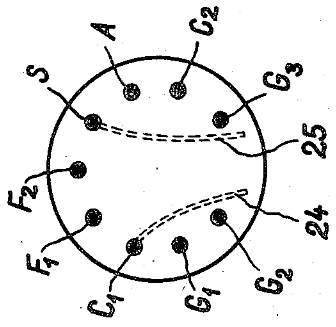
Fig. 2 is a plan view of a socket of an electron discharge tube as used in the circuit arrangement shown in Fig. 1.

Fig. 2 shows a plan view of the socket of a pentode constructed according to my co-pending patent applicaiton Ser. No. 585,299 and applied in the circuit arrangement according to Fig. 1. $G_1$, $G_2$, $G_3$ denote the stems of the grids $G_1$, $G_2$ and $G_3$ respectively of the pentode, $C_1$ the stem of the lead-in conductor $w_1$, $C_2$ the stem of the lead-in conductor $w_2$ of the cathode C. A denotes the stem of the plate, S the stem of the screening shield 18, $F_1$ and $F_2$ are the stems of the heating filament of the cathode. Except the stems $F_1$, $F_2$ the remaining stems form two groups. One group consists of the stems $G_2$, $G_1$ and $C_1$, the second group consists of the stems $G_3$, $C_2$, A and S. In the first of the said two groups the stem $G_1$ represents one of the two hot points of the pentode, namely the grid $G_1$. The stems $G_2$ and $C_1$ represent two cold points correlated to the hot point $G_1$, as the capacitances between the grid $G_1$ and the cathode C and the grids $G_1$ and $G_2$ are the greatest. In the second groups of stems the stem A represents the second hot point of the pentode. Correlated to this hot point A are the cold points $G_3$ and S, in view of the capacitances between the plate A and the grid $G_3$ on one hand and the plate A and the screening shield S on the other hand. The stems $F_1$ and $F_2$ are of secondary importance from the point of view of the relative inter-electrode capacitances, and may either be considered to constitute a "neutral zone" separating the stems of the two groups mentioned above from each other, or may be considered to belong to either of said groups, as these stems are neither hot nor cold points of the pentode.

In the socket there are provided two screening shields 24 and 25, the shield 24 being electrically connected to the stem $C_1$ representing one cold point of the first group. The screening shield 25 is electrically connected to the stem S representing one cold point of said second group. Thus each one of the two shields 24 and 25 is electrically connected to a cold point of the two groups, respectively. As a result of this arrangement the capacitances present between one of the two hot points, for example the hot point $G_1$, and a cold point, for example the cold point $G_3$ correlated to the second hot point, in the example A, is lowered. The capacitance between the two shields 24 and 25 is also a small one. It is to be understood that the cold point $C_2$ forms a member of the second group of the stems, having A as a hot point, as the alternating current flowing in the tube is to be led to the cathode.

While there has been described what, at present, is considered the preferred embodiment of the invention it will be obvious to those skilled in the art that various changes and modifications may be made therein without departing from the invention, and therefore, it is aimed in the appended claims to cover all such changes and modifications as fall within the true spirt and scope of the invention.

What I claim is:

1. A circuit arrangement for amplifying voltages of very high frequency, comprising, in combination, a plurality of multi-grid amplifier tubes, each of said amplifier tubes having at least a plate, a cathode provided with at least two lead-in conductors, a control grid, a screen grid and a suppressor grid; a plurality of bypass capacitors, each of said bypass capacitors being connected to said screen grid of each of said amplifier tubes; means connecting said amplifier tubes in series combination, said means comprising tuned circuits each interconnecting adjacent amplifier tubes from the plate of the immediately foregoing amplifier tube to the control grid of the immediately subsequent tube; each of said tuned circuits having a cold point connected to the screen grid of said immediately subsequent tube by means of one of said bypass capacitors, and to one of the lead-in conductors of the cathode of the immediately foregoing tube by another of said bypass capacitors and being further directly connected to the suppressor grid of said immediately foregoing tube and to one of the lead-in conductors of the cathode of said immediately subsequent amplifier tube; alternate ones of said tuned circuits having their cold points directly grounded, said circuit arrangement further comprising separating resistors connecting said cold points of each of the remaining ones of said tuned circuits to ground so as to ensure that only one of said lead-in conductors of the cathode of each amplifier tube is directly grounded for high frequencies, whereas the other of the lead-in conductors of the same said cathode of each amplifier tube is grounded across said separating resistor.

2. A circuit arrangement according to claim 1 wherein a screening shield is provided adjacent the envelope of each of said amplifier tubes and is connected together with the suppressor grid of its respective amplifier tube through said cold point of the tuned circuit to said one of the lead-in conductors of the cathode of its respective amplifier tube.

3. A circuit arrangement according to claim 1 wherein each of said separating resistors lies in the range of approximately 20–700 ohms.

4. A circuit arrangement according to claim 1 wherein pairs of bypass capacitors are inserted in series with said cathodes, one capacitor in each of said cathode lead-in connectors of each amplifier tube, and a high value resistor proportional in value to the ratio of cathode current to screen grid current is connected in series with one of said bypass capacitors of said pairs in at least one of the subsequent stage amplifier tubes whereby the input capacitance of such tube remains unaltered when the gain of the tube is controlled by varying the bias of its control grid.

5. A circuit arrangement according to claim 1 wherein at least two hot points and two cold points are provided in each said amplifier tube, one said hot point and at least one said cold point being correlated to one another, and means provided to lower the capacitance between said two hot points and between one hot point and a cold point correlated to said second hot point.

6. A circuit arrangement according to claim 1 wherein at least two hot points and at least two cold points are provided in each said amplifier tube and each said tube is provided with a tube socket for mechanical support and electrical connection in said circuit arrangement, said hot points and cold points being electrically connected to individual stems in said sockets, said stems being so positioned in said sockets so as to correlate one said hot point and at least one said cold point of each tube, a pair of shielding means in each of said sockets so positioned as to lower the capacitance between said two hot points and between one hot point and a cold point correlated to said second hot point, said pair of shielding means being individually connected electrically to certain of said cold points.

References Cited in the file of this patent

UNITED STATES PATENTS

| | | |
|---|---|---|
| 1,973,248 | Evans | Sept. 11, 1934 |
| 2,019,939 | Suller | Nov. 5, 1935 |
| 2,216,998 | Farrington | Oct. 8, 1940 |
| 2,332,919 | Kleen | Oct. 26, 1943 |
| 2,444,864 | Van Der Ziel | July 8, 1948 |
| 2,557,178 | Diemer | June 19, 1951 |